United States Patent Office 3,121,100
Patented Feb. 11, 1964

3,121,100
PROCESS FOR THE PRODUCTION OF ETHYLENE OXIDE BY DIRECT OXIDATION OF ETHYLENE ON SILVER CATALYST EMPLOYING CHLOROHYDRIN INHIBITOR
Harry Hermann Alfred Endler, Ferrara, Italy, assignor to Montecatini Società Generale per l'Industria Mineraria e Chimica, Milan, Italy, a corporation of Italy
No Drawing. Filed Nov. 6, 1961, Ser. No. 150,159
Claims priority, application Italy Nov. 11, 1960
2 Claims. (Cl. 260—348.5)

My invention relates to a process for continuous partial oxidation of ethylene to ethylene oxide using silver based catalysts.

A direct combination of ethylene with oxygen (also with atmospheric oxygen) can be effected with mixtures containing a wide range in the ratio between air and ethylene by using suitable catalysts, for example finely divided silver based catalyst.

Ethylene oxide is obtained from a partial oxidation of ethylene. Unfortunately, however, part of the oxidation goes to completion, resulting in large amounts of carbon dioxide and water, aside from secondary reaction products such as aldehydes. From the mixture of these reaction products, ethylene oxide can be separated in various ways.

It is known that side reactions such as mentioned above, lead to useless products and thereby to an excessive consumption of ethylene. These side reactions may be avoided by adding chlorine-containing organic substances to the synthesis gas. To this end, a number of chlorinated hydrocarbons, for example dichloroethane, poly-chlorodiphenyl, have been proposed.

In industrial preparation of ethylene oxide, however, the use of the above-mentioned inhibitors has several drawbacks, since said chlorine-containing organic compounds are not completely retained on the silver catalyst but pass through the catalyst unchanged or are decomposed to other chlorinated compounds; for example, dichloroethane is converted into vinyl chloride.

In the industrial synthesis of ethylene oxide, the above-mentioned chlorine-containing organic substances in unchanged form, or the decomposition products thereof, which also contain chlorine, pass into the washing column wherein ethylene oxide is extracted from reaction gases by means of wash water. These inhibitors then pass unchanged through the washing column, so that the recycle synthesis gas may eventually contain a chlorine concentration above the allowable limits. This concentration being able, together with fresh inhibitor added to the gas feed, to cause a rapid catalyst poisoning.

Alternatively the chlorinated compounds or the decomposition products thereof may dissolve in the wash water and therefore accompany the ethylene oxide in the concentration and rectification steps, and finally wind up in the end product. This happens particularly when the boiling point of the inhibitor substances or the decomposition products thereof are lower than or near the boiling point of ethylene oxide. The result is a non-chlorine-free product.

In the utilization of dichloroethane, the subsequent presence of vinyl chloride in the reaction gas may eventually result in the formation of polymers which are extremely detrimental to the catalyst or may present several difficulties in the recovery system.

An object of my invention, therefore, is a process for the catalytic oxidation of ethylene to ethylene oxide, wherein the above-mentioned drawbacks are avoided by means of a suitable inhibitor for the partial combustion of ethylene.

I have found that chlorinated organic compounds, which are water-soluble and moreover have a boiling point above that of water, are particularly suitable for utilization as inhibitor for ethylene oxidation and do not cause the undesired side effects either on the catalyst life or the purity of the ethylene oxide product.

I have found that water-soluble chlorohydrins, such as propylene chlorohydrin, and epichlorohydrin, etc., may be successfully used as the inhibitor. The chlorohydrin which I find to be most suitable is, however, $\beta$-chloroethanol (ethylene chlorohydrin). The amount of chlorohydrin employed depends upon the degree of purity of the ethylene used and upon the selectivity displayed by the catalyst toward the oxidation reaction. The lower the ethylene purity (below 98%) and the lower the catalyst selectivity, the greater is the quantity of inhibitor required. Generally, the inhibitor amount should not exceed 10 mg. per m.$^3$ of the gaseous mixture entering the reactor, and is preferably between 0.5 and 1 mg.

To better illustrate the present invention, but not to limit the scope thereof, an example is given hereinbelow.

Example

A multiple reactor made up of a bundle of pipes having a 22 mm. diameter and the length of 8 m., was immersed in a thermostatic bath of water. The reactor, under pressure, was charged with a silver-containing catalyst. The silver catalyst was formed on a spherical and porous carrier having a low specific surface, of 5 to 8 mm. diameter. The carrier was coated with activated silver or a mixture of silver-containing compounds. Preferably the catalyst used was one prepared according to Patent No. 2,825,701, dated March 4, 1958, the disclosure of which is incorporated herein by reference. In the above-mentioned patent the catalyst is prepared by coprecipitation of silver and alkaline-earth metal salts by a carbonate to form silver and alkaline-earth metal carbonate. The mixture of the coprecipitated carbonates, after careful washing, is suspended in a water-ethylene-glycol mixture, and mixed with silicon carbide in spheres having a porosity of about 45%. The resulting mixture is then heated while stirring until most of the water evaporates. The spheres then become uniformly coated with a layer of the mixed carbonates. The catalyst spheres are heated for 1 to 2 hours at 400° C. to activate them. The finished catalyst may then contain from 5 to 10% silver and from 10 to 25% of alkaline-earth carbonates based on the amount of silver.

A gas mixture made up of about 4% ethylene, 6.5% oxygen and 7% carbon dioxide (the remainder being nitrogen) is conveyed to the reactor which has previously been charged with the catalyst, at the reaction temperature of 255° C. When the reaction is carried out on an industrial scale, a pressure of 9 to 15 atmospheres and a space velocity of from 5000 to 7000 h.$^{-1}$ are used. This results in a relatively poor conversion of ethylene to ethylene oxide with about 14% per pass with reference to ethylene and with a 63% yield on the basis of the ethylene consumed.

When I add ethylene chlorohydrin, to the gases entering the reactor, in the proportion of from 0.5 to 1 mg. per m.$^3$ of the gas entering, the conversion rate of ethylene oxide is raised to 20.5% per pass with a yield of 75% based on the ethylene consumed.

The above-described reaction mixture may have a composition which varies between 2 and 10% ethylene and from 5 to 8% oxygen, the remainder being composed of carbon dioxide and nitrogen originating from the recycle of a portion of the gas and from the introduction of fresh air. The reaction temperature may vary from 200 to 300° C. and the pressure may reach as high as 20 atmospheres. Such reaction conditions are strictly dependent on the space velocity of the gases and on the catalyst age; they are chosen together with the amount of inhibitor to assure the optimum conditions for the formation of ethylene oxide.

In industrial practice of my process, generally the synthesis gas recycle is carried out, after removal by absorption with water of ethylene oxide contained therein. Only an aliquot portion thereof is vented in order to maintain the desired constant pressure.

At this point, the advantages of the use of β-chloroethanol or similar compound as an inhibitor become apparent. Whereas the β-chloroethanol or similar compound, owing to its water solubility, is quantitatively absorbed; other chlorinated inhibitor compounds, which are not soluble in water and which are not completely removed in the washing step and therefore are in the recycle gas, cause an excessive concentration of chlorinated products which are not tolerable in the synthesis gas. Furthermore, in the particular case of β-chloroethanol, the decomposition product after chlorine fixation by means of the silver catalyst, yields only ethylene oxide per se. This is an obvious advantage in that the substance introduced is the same as the desired product. This removes all detrimental side effects which would originate from pollution of the recycled gas. The further treatment of the aqueous extract of ethylene oxide consists of conventional steam stripping, concentration and rectification of the oxide.

The use of an inhibitor which, according to my invention, is water-soluble and has a boiling point above 100° C. offers still a further advantage in that it permits one to be sure that no chlorinated compounds are carried over in the stripping and ethylene oxide concentration steps to pollute the final product.

The addition of β-chloroethanol to the synthesis gas may readily be carried out batchwise or it may be added continuously, by pumping, either concentrated or diluted with water when small dosages are required. The amount of inhibitor may be chosen to vary from approximately 0.1 to about 10 mg./m.$^3$ of gas.

While the specific example made reference to β-chloroethanol, other chlorinated water-soluble organic compounds may be used. Illustrative of these are epichlorohydrin, chlorinated alcohols, chloro-ketones, etc.

Obviously, other modifications or variations of my invention are possible in the light of the above teachings. It is therefore to be understood that within the scope of the appended claims, my invention may be practiced otherwise than specifically described.

I claim:

1. In the process of production of ethylene oxide by direct oxidation of ethylene with oxygen using a silver catalyst, the improvement which consists essentially of adding to the reaction gas mixture from 0.1 to 10 mg. per m.$^3$ of inhibitor per m.$^3$ of synthesis gas entering the reactor, said inhibitor consisting of a water-soluble chlorohydrin having a boiling point above 100° C.

2. In the process of production of ethylene oxide by direct oxidation of ethylene with oxygen using a silver catalyst, the improvement which consists essentially of adding to the reaction gas mixture an inhibitor consisting of β-chloroethanol, the amount of said β-chloroethanol being between 0.5 and 1 mg. per m.$^3$ of synthesis gas entering the reactor.

References Cited in the file of this patent

UNITED STATES PATENTS

| | | |
|---|---|---|
| 2,270,780 | Berl | Jan. 20, 1942 |
| 2,279,469 | Law et al. | Apr. 14, 1942 |

FOREIGN PATENTS

| | | |
|---|---|---|
| 524,007 | Great Britain | July 26, 1940 |